TRANSISTOR BLOCKING OSCILLATOR INCLUDING MEANS FOR CONTROLLING THE FLYBACK WAVEFORM

Filed May 12, 1964

INVENTOR

RIJKENT J. NIENHUIS

BY [signature]

AGENT 3,296,486

TRANSISTOR BLOCKING OSCILLATOR INCLUDING MEANS FOR CONTROLLING THE FLY-BACK WAVEFORM

Rijkent Jan Nienhuis, Mollenhutseweg, Nijmegen, Netherlands, assignor to North American Philips Company, Inc., New York, N.Y., a corporation of Delaware Filed May 12, 1964, Ser. No. 366,843
Claims priority, application Netherlands, May 14, 1963, 292,751
6 Claims. (Cl. 315—27)

Figure 1:
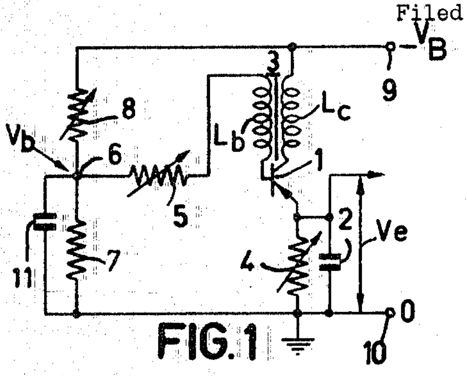

The invention relates to a blocking oscillator for the production of a sawtooth control signal for the output transistor of a vertical deflection circuit. The circuit comprises a switching transistor and a transformer. The primary winding of the transformer is connected in the output circuit and the secondary winding in the control circuit of the switching transistor. A capacitor resistor network is included in the output circuit of the switching transistor, the sawtooth control signal being produced across the said capacitor.

The control signal produced by such a blocking oscillator may be employed to control, if desired after amplification and phase inversion, the output transistor of a television vertical deflection circuit. The collector circuit of this output transistor includes the vertical deflection coil which, together with any other inductances connected in the collector circuit, has an inductance value $L_y$. During the time of the forward stroke of the sawtooth deflection current electromagnetic energy is accumulated in the inductance $L_y$ and during the fly-back period this electromagnetic energy is dissipated.

In the known vertical deflection circuit this is effected in a manner such that the output transistor is cut off as soon as possible after the termination of the forward stroke, and during the fly-back period the electromagnetic energy is dissipated by a damping element connected in the collector circuit of the output transistor. If the damping is exclusively entrusted to the ohmic resistance of the deflecting coil and to any further ohmic resistances present in the circuit, frequently the time required to dissipate the said electromagnetic energy is longer than the available fly-back period. As a rule, additional damping elements such as diodes and voltage-dependent resistors (generally referred to as V.D.R.'s) are included in the output circuit of the output transistor. However, this means at least one additional circuit element. It is true that a V.D.R. is to be preferred because it usually is less expensive, however, the V.D.R. dissipates energy also during the time of the forward stroke so that the output transistor has to provide more energy than is the case without such a V.D.R.

In addition, a diode or V.D.R. is also required to ensure that during the fly-back the collector voltage of the output transistor does not exceed a given breakdown voltage since otherwise avalanche conduction may occur. Avalanche conduction and the associated reverse base current may considerably reduce the useful life of the output transistor.

It is the object of the invention to produce by means of a blocking oscillator a control signal which during the fly-back so controls the output transistor that it is not driven into avalanche conduction, without the need for the inclusion of additional damping elements in the collector circuit of the output transistor.

For this purpose the blocking oscillator in accordance with the invention is characterized in that, in order to obtain a substantially sinusoidal or even linear variation of the sawtooth control signal during its fly-back period, the primary winding is so connected that the current flowing through the capacitor during the fly-back flows through the switching transistor and the primary winding, while the condition $$\frac{R_b^2 C_e}{L_c} \geqq n(n+1)^3$$

must apply at least approximately, where $R_b$ is the overall ohmic resistance in the control circuit, $C_e$ the capacitance value of the capacitor, $L_c$ the inductance for the magnetizing current of the transformer and $n$ the transformation ratio between the secondary and primary windings of the transformer.

The invention is based on the recognition of the fact that the collector voltage of the output transistor will increase by the smallest possible amount if the control signal required to switch off the collector current of the output transistor during the fly-back time has a linear variation. During the fly-back the collector voltage $V_c$ is determined by the equation:

$$V_c = L_y \frac{di}{dt}$$

where $i$ is the current through the inductance $L_y$. If $i$ varies linearly during the entire fly-back, not only is $V_c$ constant but this value will be smaller than if the current should have a non-linear variation. In the latter case the slope of the current-time curve is steeper and hence the factor $di/dt$ which is a measure of the said slope, is greater so that the voltage $V_c$ will also be greater. By causing the control signal to vary substantially linearly during the fly-back the deflection current also will have a substantially linear variation during the fly-back time. A suitable choice of the duration of the switching-off current enables the collector voltage to be maintained below the voltage at which avalanche conduction occurs.

Obviously the fly-back current may also be more or less sinusoidal, for especially in this case the collector voltage will be a minimum at the beginning of the fly-back time, at which time a comparatively large collector current still flows, and hence the dissipation will be a minimum at the same large initial current. It is true, that a subsequently greater collector voltage $V_c$ will occur than in the case of a linear variation, but the collector current will then have decreased considerably.

The above control arrangement is of particular advantage in transistor circuits because the hole storage effect in the base region of the transistor prevents the output transistor from being abruptly switched off at the commencement of the fly-back. If no damping elements are used, this means that even when a signal is applied which produces blocking immediately at the commencement of the fly-back the collector current persists for some time and the collector voltage increases to a high value. Hence it is better for the current reduction to be gradual so that the voltage does not rise to so high a value.

Figure 2:
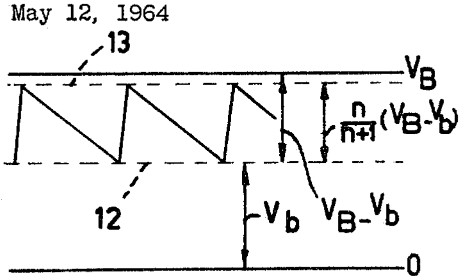
Figures 3, 4:
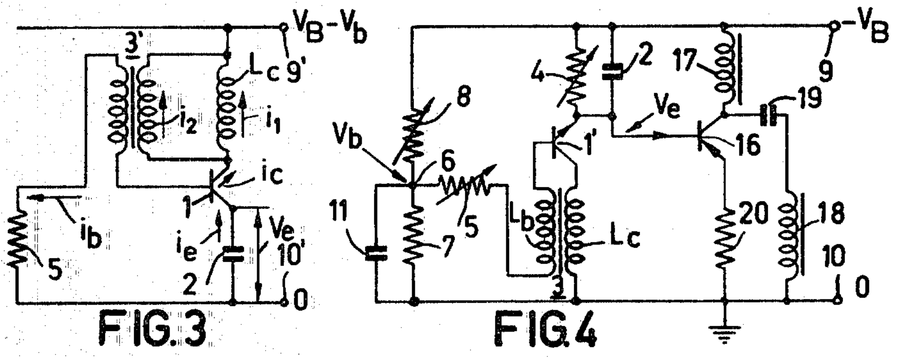
Figure 5:
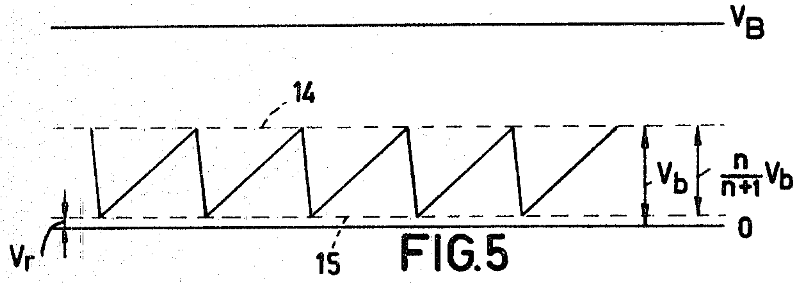
Figure 6:
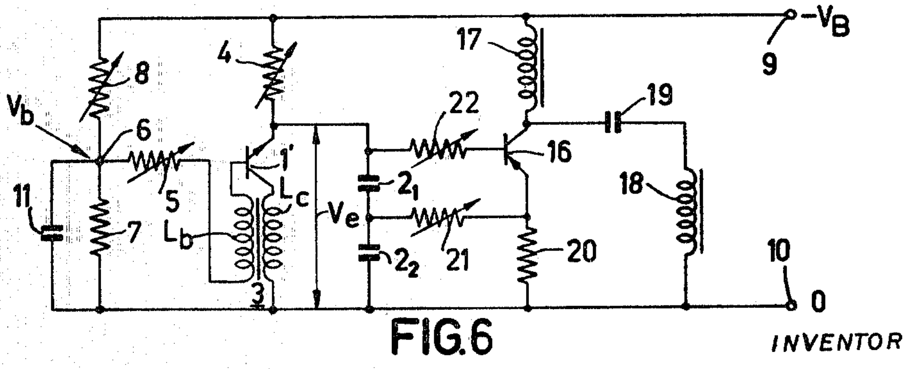

A few possible embodiments of blocking oscillators according to the invention will now be described with reference to the accompanying drawings, in which:

FIGURE 1 is a circuit diagram of an embodiment including a pnp-switching transistor, FIGURE 2 shows a sawtooth control voltage produced by the oscillator of FIGURE 1, FIGURE 3 is an equivalent circuit diagram of the oscillator of FIGURE 1, FIGURE 4 shows an embodiment including a npn-switching transistor, FIGURE 5 shows a sawtooth voltage produced by the oscillator of FIGURE 4, and FIGURE 6 is a slightly modified embodiment of the blocking oscillator of FIGURE 4.

In FIGURE 1 a p-n-p-transistor 1 acts as a switching transistor to change capacitor 2 during the fly-back time.

The sawtooth voltage $V_e$ is produced across capacitor 2. For this purpose the transistor 1 is connected in a blocking oscillator circuit which further includes a transformer 3. The primary winding $L_c$ of the transformer is connected in the collector circuit of the transistor 1 and the secondary winding $L_b$ is connected in the base circuit of the said transistor. The capacitor 2 and a resistor 4 are connected in the emitter circuit of the transistor 1. The end of the winding $L_b$ remote from the base is connected through a variable resistor 5 to the junction 6 of a potentiometer circuit comprising resistors 7 and 8 and connected between terminals 9 and 10. The terminal 9 is connected to the negative terminal and the terminal 10 to ground and to the positive terminal of a voltage supply source providing a supply voltage of $V_B$ volts. Thus, the voltage set up at the junction 6 with respect to ground is given by $$V_b = \frac{R_7}{R_7 + R_8} V_B$$

where $R_7$ and $R_8$ are the resistance values of the resistors 7 and 8 respectively. The resistor 7 is shunted by a capacitor 11 to allow the passage of the base current $i_b$ flowing during the fly-back so that with respect to the alternating current circuit the capacitor 11 effectively short-circuits the resistor 7.

The blocking oscillator operates as follows: It is assumed that the capacitor 2 has a charge such that the voltage at the emitter of a transistor 1 is negative with respect to the voltage at the junction 6. In condition the transistor 1 is cut-off and the charge of the capacitor 2 may flow away through the resistor 4. This discharge will continue until the voltage at the emitter exceeds the voltage $V_b$ set up at the junction 6. As a result the transistor 1 is rendered conductive and a collector current $i_c$ starts to flow. This current flows through the primary $L_c$ and induces a voltage in the secondary $L_b$. Consequently a current $i_b$ will flow in the base circuit of the transistor 1 and render the transistor more conductive. This again gives rise to a greater collector current and so on, so that owing to this cumulative effect the transistor will pass a comparatively large current and the capacitor 2 is charged through the winding $L_c$ and the transistor 1. This charging process will continue until, allowing for the voltage drop across the winding $L_c$, the voltage at the emitter becomes so high that the voltage between the emitter and the collector becomes too small to maintain the substantially constant charging current for the capacitor 2. When as a result thereof the transistor current decreases a voltage of opposite polarity is induced in the winding $L_b$ so that the transistor current is further reduced and a still higher voltage is induced in $L_b$ and so on, so that the transistor 1 is again cut off. Thus the aforementioned initial condition is again reached and the capacitor 2 will then discharge through the resistor 4 and the entire cycle is repeated. This is illustrated in FIGURE 2, in which a broken line 12 represents the voltage $V_b$ at the junction 6 and a broken line 13 represents the voltage to which the capacitor 2 is charged.

With reference to the equivalent circuit diagram of FIGURE 3 we will now calculate how the circuit arrangement is to be proportioned to ensure that the voltage $V_e$ across the capacitor 2 varies substantially linearly during the fly-back time. In this calculation the transformer 3 is not considered as an ideal transformer but requires a certain magnetising current to make up for the losses in the transformer, particularly the iron losses. As is known such a non-ideal transformer may be represented by the ideal transformer 3' (FIGURE 3) and an inductance $L_c$ connected in parallel with the primary of the ideal transformer. The inductance $L_c$ is to be considered as the magnetisation inductance through which the magnetising current $i_1$ flows.

The charging current of the capacitor 2 includes not only an ohmic component produced by the ohmic resistances in the circuit and the transistor current but also an inductive component produced by the magnetisation inductance $L_c$. If the ohmic component only were present, the voltage $V_e$ across the capacitor 2 would vary exponentially. If, however, the inductive component only were present, the voltage $V_e$ would be more or less sinusoidal. The curature due to the exponential variation is opposite to that due to the sinusoidal variation so that with a proper choice of the values the two curvatures may cancel one another and hence the desired linear variation during the fly-back time may be obtained.

This can be proven with reference to the equivalent circuit diagram of FIGURE 3, with due regard to the following remarks. The voltage between the terminals 9' and 10' of FIGURE 3 is assumed to be $(V_B - V_b)$ volts because, as FIGURE 2 shows, the voltage $V_e$ does not fall below the value $V_b$ so that when in FIGURE 3 the voltage across the capacitor 2 is assumed to fall to 0 volts the applied voltage is to be $(V_B - V_b)$ volts. Thus the voltage divider 7, 8 may be omitted, since the direct voltage is no longer significant and in addition the resistor 7 is short-circuited for alternating current by the capacitor 11. In the charging process the resistor 4 is substantially insignificant and hence may be dispensed with in the equivalent circuit diagram of FIGURE 3 which obviously applies only to the fly-back time.

By means of the Laplace operators it may be deduced from the circuit diagram of FIGURE 3 that the voltage $V_e$ across the capacitor 2 in the $p$ region is given by:

$$Ve_{(p)} = (V_B - V_b)\frac{\left(1 + p\tau_2\frac{n}{n+1}\right)}{p(p^2\tau_1\tau_2 + p\tau_2 + 1} \quad (1)$$

where:

$$\tau_1 = \frac{E_bC_e}{(1+n)^2}$$

and:

$$\tau_2 = \frac{L_c(n+1)^2}{R_b}$$

where $R_b$ is the resistance value of the resistor 5 increased by the ohmic resistance of the secondary winding $L_b$ and any further ohmic resistance which may be included in the base circuit of the transistor 1 and may influence the current $i_b$, $L_c$ is the said magnetisation inductance, $C_e$ is the capacitance value of the capacitor 2 and $n$ is the transformation ratio between the secondary and primary windings of the transformer 3.

Transformation of the voltage $V_e$ from the $p$-region to the $t$-region yields:

$$Ve_{(t)} = (V_B - V_b)\left[1 - e - \frac{t}{2\tau_1}\left(\cos\frac{mt}{2\tau_1} - \frac{n-1}{m(n+)}\sin\frac{mt}{2\tau_1}\right)\right] \quad (2)$$

where:

$$m^2 = 4\frac{\tau_1}{\tau_2} - 1$$

By means of series development the Equation 2 may be written with a certain approximation:

$$Ve_{(t)} = (V_B - V_b)\left[\frac{n}{n+1}\frac{t}{\tau_1} + \frac{t^2}{8\tau_1^2}\left(m_2 - \frac{3n-1}{n+1}\right)\right] \quad (3)$$

The Equation 3 will pass into a linear function of $t$ if:

$$m^2 = \frac{3n-1}{n+1} \quad (4)$$

or after insertion of the values of $m^2$, $\tau_1$ and $\tau_2$:

$$\frac{R_b^2C_e}{L_c} = n(n+1)^3 \quad (5)$$

Thus the Equation 3 becomes:

$$Ve_{(t)}=(V_B-V_b)\frac{n}{n+1}\frac{t}{\tau^1} \quad (6)$$

Since in the equivalent circuit diagram of FIGURE 3 we have started from the condition in which the voltage $V_e=0$ at the instant $t=0$ (that is to say, $t=0$ is the beginning of the fly-back time) it follows that on termination of the flyback the voltage will have a value:

$$(V_B-V_b)\frac{n}{n+1} \quad (7)$$

if:

$$t=\tau_1$$

In other words, if the fly-back time $t_o$ is equal to $\tau_1$ or $$t_o=\frac{R_bC_e}{(1+n)^2} \quad (8)$$

the sawtooth voltage will have a constant amplitude as given by the Equation 7.

The above dissertation also shows that the amplitude is substantially independent of the value of the resistor 4. Hence the variable resistor 8 enables the desired amplitude to be adjusted since it determines the voltage $V_b$, and the variable resistor 4 enables the frequency to be adjusted since the forward stroke time, that is to say, the time required to cause the voltage $V_e$ to fall from the voltage $$V_b+\frac{n}{n+1}(V_B-V_b)$$

to the value $V_b$, is determined by the RC-period of the resistance network 2, 4.

If instead of a purely linear variation a more or less sinusoidal variation of the voltage $V_e$ during the fly-back is desired, the term $t^2$ in the Equation 3 must have a positive sign. This is the case if:

$$m^2>\frac{3n-1}{n+1} \quad (4')$$

or $$\frac{R_b^2C_e}{L_c}>n(n+1)^3 \quad (5')$$

Hence the best method of control is obtained if the condition:

$$\frac{R_b^2C_e}{L_c}\geq n(n+1)^3$$

is satisfied and the fly-back time $t_o$ is chosen so that the output transistor is not driven into avalanche conduction. This means that if the above described method of control and fly-back time are used, at a given inductance value in the collector circuit of the output transistor the collector voltage remains below the value at which avalanche conduction will occur.

The circuit arrangement of FIGURE 1 has a limitation in that the lowest level of the produced sawtooth voltage $V_e$ is situated at the value $V_b$, thus preventing any direct-current coupling between the blocking oscillator and the output transistor, for the level indicated by the line 12 of FIGURE 2 lies too high to be used as the minimum level for the output transistor. The minimum current through the output transistor, which occurs at the beginning of the forward stroke, would in this case be excessively high and hence give rise to unnecessarily high dissipation. In addition the sawtooth control voltage shown in FIGURE 2 is in the wrong phase. If the output transistor were controlled by means of such a sawtooth voltage, the current through the output transistor would increase during the fly-back whereas the general tendency is to reduce this current during the fly-back. Obviously the phase may be inverted by a phase inverter stage, however, this would require an additional stage and furthermore there remains the disadvantage that the level indicated by the line 12 is too high to permit direct-current coupling.

These disadvantages may be obviated by use of the blocking oscillator shown in FIGURE 4. This oscillator is substantially identical with that of FIGURE 1, however, the p-n-p-transistor 1 of FIGURE 1 is replaced by a n-p-n-transistor 1', the collector and emitter circuit connections being accordingly changed over with respect to the terminals 9 and 10. The operation of the oscillator of FIGURE 4 also is the same. When we start from the condition in which the capacitor 2 is charged to a value such that the voltage at the emitter of the transistor 1 is positive with respect to the voltage $V_b$ at the junction 6, the transistor 1' again cut off and the capacitor 2 can discharge through the resistor 4. If the voltage at the said emitter falls below the valve $V_b$, the transistor 1' will pass current, and similarly to what has been described with reference to FIGURE 1, the capacitor 2 is charged until the transistor 1' is no longer capable of providing the required constant charging current so that another discharge period, the fly-back period, is initiated. Thus a sawtooth control voltage of the shape shown in FIGURE 5 is produced having a maximum level at the voltage $V_b$ indicated by a broken line 14. It can be calculated that for a fly-back time $t_o$ as given by the Equation 8 the amplitude is equal to:

$$\frac{n}{n+1}V_b \text{ volts}$$

The minimum level $V_r$ lies at a value:

$$V_r=V_b-\frac{n}{n+1}V_b=\frac{1}{n+1}V_b \text{ volts}$$

The minimum or residual value $V_r$ may be maintained small if it is possible to make $n$ large enough. The residual value $V_r$ is indicated in FIGURE 5 by a line 15.

As FIGURE 5 shows, the said sawtooth voltage has the correct phase for controlling the output transistor 16. The collector circuit of transistor 16 includes a choke coil 17, a vertical deflection coil 18 and a capacitor 19 which does not pass direct current. The emitter circuit includes a compensating resistor 20.

The circuit arrangement shown in FIGURE 4 still has a limitation in that the sawtooth voltage is not compensated during the period of the forward stroke since the discharge through the resistor 4 is purely exponential. This disadvantage may be obviated by the circuit arrangement shown in FIGURE 6, in which a capacitor 2 is divided into two capacitors $\mathbf{2}_1$ and $\mathbf{2}_2$, which are connected between the collector of the transistor 1' and the positive terminal 10 instead of between the said collector and the negative terminal 9.

As a result the capacitors $\mathbf{2}_1$ and $\mathbf{2}_2$ are charged through the resistor 4 during the time of the forward stroke and discharge through the transistor 1' and the primary winding $L_c$ during the fly-back time. This results in a sawtooth voltage similar to that produced by the circuit arrangement of FIGURE 4 with, however, the additional possibility of compensation by feeding back the voltage produced across the emitter resistor 20 through a resistor 21 to the junction of the capacitors $\mathbf{2}_1$ and $\mathbf{2}_2$ to provide compensation. Thus the resistor 21 enables the degrees of compensation to be adjusted so that the desired linearity of the vertical deflection is achieved. A further linearity control may be effected by means of a resistor 22.

As has been set forth hereinbefore, the amplitude of the sawtooth voltage produced depends inter alia upon the voltage $V_b$ at the junction 6. This voltage is adjustable by means of the potentiometer circuit constituted by the resistors 7 and 8. In principle, this potentiometer circuit may be omitted so that the amplitude of the sawtooth voltage becomes equal to $$\frac{n}{n+1}V_B$$

Such a high amplitude, however, prevents sufficient compensation of the exponential nature of the sawtooth voltage during the time of the forward stroke. Therefore, by means of the resistors 7 and 8 the amplitude is adjusted so that linearity compensation becomes possible and in addition the desired degree of driving of the output transistor 16 is exactly achieved.

It should be noted that if at the chosen value of $n$, which choice is mainly determined by the Equations 5, 5′ and 8 the residual value $V_r$ still is too high for correct control of the output transistor 16 (too large a minimum current flowing through the output transistor at the beginning of the type of the forward stroke), this residual value $V_r$ may be eliminated by one of the methods proposed in U.S. Patent No. 3,229,151 and copending application Serial No. 285,918 filed June 6, 1963.

I claim:

1. A transistor blocking oscillator for producing a signal having a sawtooth-shaped waveform, comprising a transistor having input, common and output electrodes, a transformer having primary and secondary windings, a source of operating potential having first and second terminals, a first resistor, means serially connecting said resistor, the common-output electrode path of said transistor, and said primary winding between said first and second terminals, an unbypassed second resistor connecting said secondary winding between said input electrode and a point of fixed potential, whereby the instantaneous input electrode current of said transistor flows through said unbypassed resistor, capacitor means, means connecting said capacitor means between the end of said first resistor connected to said transistor and one of said terminals, whereby current of said capacitor means flows through said primary winding and transistor during the flyback time of said signal, and output means for deriving said signal from said capacitor means, the components of said oscillator being related to satisfy the expression:

$$\frac{R_b^2 C_e}{L_c} \geqq n(n+1)^3$$

wherein $R_b$ is the resistance of said secondary winding and unbypassed resistor, $C_e$ is the capacitance of said capacitor means, $L_c$ is the inductance for the magnetizing current of said transformer, and $n$ is the transformation ratio between said secondary and primary windings.

2. A transistor blocking oscillator for producing an output signal having a sawtooth-shaped waveform, comprising a transistor having base, emitter and collector electrodes, a transformer having primary and secondary windings, a source of operating potential having first and second terminals, a resistor, means connecting said resistor between said emitter electrode and first terminal, means connecting said primary winding between said collector electrode and second terminal, unbypassed resistor means connecting said secondary winding between said base electrode and a point of fixed potential, whereby instantaneous base current flows through said unbypassed resistor means, capacitor means, means connecting said capacitor means between said emitter and one of said terminals, whereby current of said capacitor means flows through said primary winding and emitter-collector path during the flyback time of said signal, and output means for deriving said signal from said capacitor means, the components of said oscillatar being related to satisfy the expression:

$$\frac{R_b^2 C_e}{L_c} \geqq n(n+1)^3$$

wherein $R_b$ is the resistance of said secondary winding and said unbypassed resistor means, $C_e$ is the capacitance of said capacitor means, $L_c$ is the inductance for the magnetizing current of said transformer, and $n$ is the winding ratio between said secondary and primary windings.

3. The oscillator of claim 2, in which said transistor is a p-n-p-type transistor, said first and second terminals being positive and negative terminals of said source, respectively, wherein said point is the junction of first and second resistance means connected between said first and second terminals, at least one of said first and second resistance means being bypassed by capacitor means.

4. The oscillator of claim 2, in which said transistor is an n-p-n-type transistor, said first and second terminals being negative and positive terminals of said source, respectively, said one terminal being said positive terminal, wherein said point of fixed potential is the junction of first and second resistance means connected between said first and second terminals, at least one of said first and second resistance means being bypassed by capacitor means.

5. A transistor circuit for producing a current having a sawtooth-shaped waveform in a coil, comprising first and second transistors each having base, emitter and collector electrodes, means connecting said first transistor as a blocking oscillator comprising a transformer having primary and secondary windings, a source of potential having first and second terminals, a resistor connected between the emitter of said first transistor and said first terminal, means connecting said primary winding between the collector of said first transistor and said second terminal, capacitor means connected between the emitter of said first transistor and one of said terminals, whereby current of said capacitor means flows through said primary winding and the emitter-collector path of said first transistor during the flyback period of said current, unbypassed resistance means connecting said secondary winding between the base of said first transistor and a point of fixed potential, whereby the instantaneous base current of said first transistor flows through said unbypassed resistance means, the components of said blocking oscillator being related to satisfy the expression:

$$\frac{R_b^2 C_e}{L_c} \geqq n(n+1)^3$$

wherein $R_b$ is the resistance of said secondary winding and unbypassed resistance means, $C_e$ is the capacitance of said capacitor, $L_c$ is the inductance for magnetizing current of said transformer, and $n$ is the transformation ratio between said secondary and primary windings, means connecting said capacitor means between the base and emitter of said second transistor, and means connecting said coil between the collector and emitter of said second transistor.

6. The circuit of claim 5 wherein the flyback time $t_0$ is adjusted so that avalanche conduction in said second transistor is prevented, and $$t_0 \geqq \frac{R_b C_{e2}}{(1+n)^2}$$

References Cited by the Examiner

UNITED STATES PATENTS

| | | | |
|---|---|---|---|
| 2,939,040 | 5/1960 | Isabeau | 331—112 X |
| 3,098,171 | 7/1963 | Ashley | 315—27 |

OTHER REFERENCES

Electronic Engineering: September 1961, page 576, 331–112.

NATHAN KAUFMAN, *Primary Examiner.*

ROY LAKE, J. B. MULLINS, *Assistant Examiners.*